(12) United States Patent
Asao et al.

(10) Patent No.: US 6,462,453 B1
(45) Date of Patent: Oct. 8, 2002

(54) STATOR FOR AN ALTERNATOR

(75) Inventors: Yoshihito Asao; Hiroki Katayama; Katsumi Adachi, all of Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/706,811

(22) Filed: Nov. 7, 2000

(30) Foreign Application Priority Data

Feb. 21, 2000 (JP) ........................................ 2000-042833

(51) Int. Cl.[7] ................................................ H02K 1/00
(52) U.S. Cl. ......................... 310/179; 310/259; 310/260
(58) Field of Search ................................ 310/179, 260, 310/43, 45, 270, 259, 201, 208, 184, 254

(56) References Cited

U.S. PATENT DOCUMENTS 4,298,656 A * 11/1981 Mendelsohn ................ 428/414
4,616,407 A * 10/1986 Tamaki et al. ................ 29/596
6,147,432 A * 11/2000 Kusase et al. ............... 310/260
6,181,044 B1 * 1/2001 Umeda et al. ............... 310/201

FOREIGN PATENT DOCUMENTS

| DE | A-199-22-794 | 11/1999 |
| JP | 7-44797 | 11/1987 |
| JP | 04-026345 | 1/1992 |
| JP | A-11-155270 | 6/1999 |
| JP | 11-341730 | 12/1999 |

* cited by examiner

Primary Examiner—Joseph Waks
Assistant Examiner—Thanh Lam
(74) Attorney, Agent, or Firm—Sughrue Mion, PLLC

(57) ABSTRACT

An electrically-insulating resin portion is formed by applying a resin so as to cover apex portions of coil ends forming a coil end group, that is, weld portions and surfaces of portions where an insulation coating has been removed from free ends of coil segments which constitute joint portions between the free ends. Spaces between radially-adjacent joint portions may be filled by the electrically-insulating resin portion. In addition, air passage spaces may be ensured between circumferentially-adjacent joint portions.

16 Claims, 19 Drawing Sheets

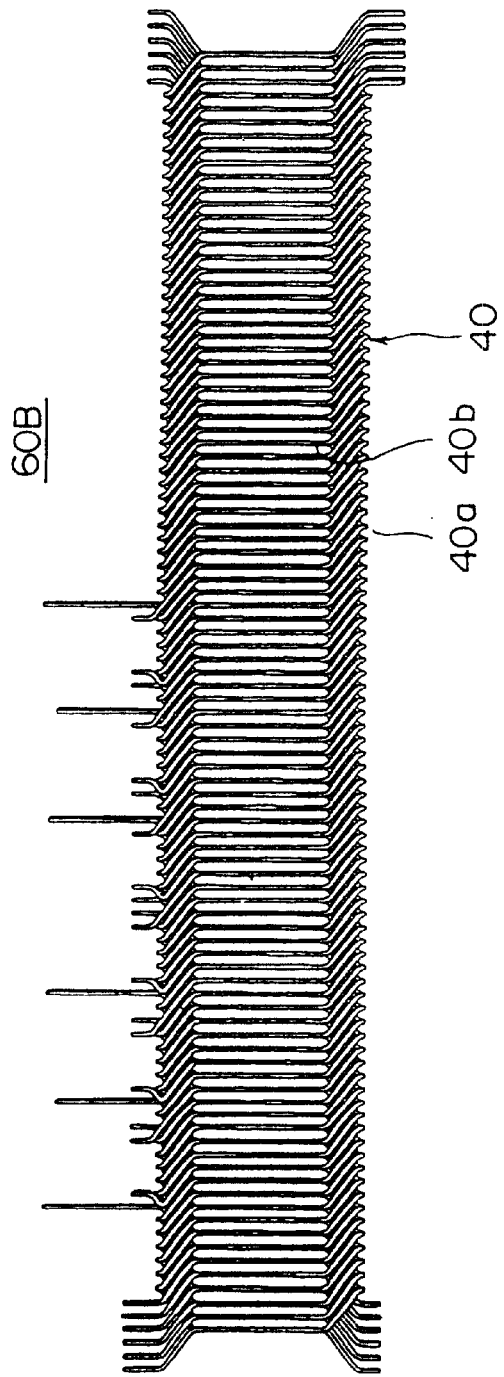
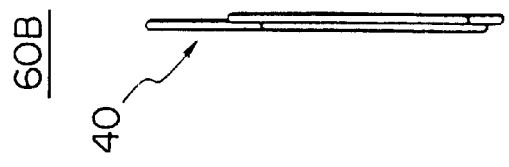

STATOR FOR AN ALTERNATOR

BACKGROUND OF THE INVENTION

1. Field of the Invention

The present invention relates to a stator for an alternator driven by an internal combustion engine, for example, and in particular, relates to a stator construction for an automotive alternator mounted to an automotive vehicle such as a passenger car or a truck.

2. Description of the Related Art

FIG. 20 is a cross section showing a conventional automotive alternator.

In FIG. 20, the automotive alternator includes: a case 3 composed of an aluminum front bracket 1 and an aluminum rear bracket 2; a shaft 6 rotatably mounted inside the case 3, a pulley 4 being fastened to a first end of the shaft 6; a Lundell-type rotor 7 fastened to the shaft 6; fans 5 fastened to first and second axial ends of the stator 78; a stator 8 fastened to an inner wall of the case 3 50 as to cover an outer circumferential side of the rotor 7; slip rings 9 fastened to a second end of the shaft 6 for supplying electric current to the rotor 7; a pair of brushes 10 which slide in contact with the slip rings 9; a brush holder 11 for holding the brushes 10; a rectifier 12 which is electrically connected to the stator 8 to convert alternating current generated in the stator 8 into direct current; a heat sink 17 fitted onto the brush holder 11; and a regulator 18 mounted on the heat sink 17 for adjusting the magnitude of an alternating voltage generated in the stator 8.

The rotor 7 is composed of a rotor coil 13 for generating magnetic flux on passage of electric current, and a pair of pole cores 20 and 21 disposed so as to cover the rotor coil 13, magnetic poles being formed in the pole cores 20 and 21 by magnetic flux generated in the rotor coil 13. The pair of pole cores 20 and 21 are made of iron, each has eight claw-shaped magnetic poles 22 and 23 disposed on an outer circumferential perimeter at even pitch in a circumferential direction so as to project axially, and the pole cores 20 and 21 are fastened to the shaft 6 facing each other such that the claw-shaped magnetic poles 22 and 23 intermesh.

The stator 8 is provided with a stator core 15, and a stator coil 16 which generates alternating current due to changes in magnetic flux produced by the rotor coil 13 accompanying the rotation of rotor 7 wound to the stator core 15.

In the automotive alternator constructed in this manner, electric current is supplied from a battery (not shown) through the brushes 10 and the slip rings 9 to the rotor coil 13, generating magnetic flux. The claw-shaped magnetic poles 22 of the first pole core 20 are magnetized with north-seeking (N) poles by this magnetic flux, and the claw-shaped magnetic poles 23 of the first pole core 21 are magnetized with south-seeking (S) poles.

At the same time, rotational torque from the engine is transmitted through the belt and the pulley 4 to the shaft 6, rotating the rotor 7. Thus, a rotating magnetic field is applied to the stator coil 16, generating electromotive force in the stator coil 16. This alternating electromotive force passes through the rectifier 12 and is converted into direct current, the output is adjusted by the regulator 18, and the battery is recharged.

When generating electricity, the rotor coil 13, the stator coil 16, the rectifier 12, and the regulator 18 continuously generate heat. In an alternator having a rated output current in the 100A class, these components generate 60W, 500W, 120W, and 6W of heat, respectively at rotational points at which the temperature is high.

In order to cool this heat produced due to the generation of electricity, air intake openings 1a and 2a are disposed in axial end surfaces of the front bracket 1 and the rear bracket 2, and air discharge openings 1b and 2b are disposed in two outer circumferential shoulder portions of the front bracket 1 and the rear bracket 2, opposite the radial outside of the front-end and rear-end coil end groups 16f and 16r of the stator coil 16.

At the rear end, external air is drawn in through the air intake openings 2a disposed opposite the heat sink of the rectifier 12 and the heat sink 17 of the regulator 18, respectively, by rotation of fans 5, flowing along the axis of the shaft 6, cooling the rectifier 12 and the regulator 18, and is then deflected centrifugally by the fans 5, cooling the rear-end coil end group 16r of the stator coil 16 before being expelled to the outside through the air discharge openings 2b. At the same time, at the front end, external air is drawn in axially through air intake openings 1a by rotation of the fans 5, and is then deflected centrifugally by the fans 5, cooling the front-end coil end group 16f of the stator winding 16 before being expelled to the outside through the air discharge openings 1b.

Next, a method of winding the stator coil 16 will be explained with reference to FIG. 22. Moreover, for convenience, the method of winding a coil having one turn is shown in FIG. 22.

The stator coil 16 is constructed by connecting in series a number of coil segments 30 (strands of wire) composed of a copper material, for example, which are short electrical conductors having a flat cross section coated with insulation. Each coil segment 30 is formed into a general U shape composed of a pair of straight portions 30a connected by a V-shaped turn portion 30b.

The coil segments 30 are inserted from the rear end two at a time into sets of slots 15a three slots apart. At that time, four straight portions 30a are housed in each of the slots 15a so as to line up in one row in a radial direction. The coil segments 30 on an inner circumferential side are each inserted into a first position from the inner circumferential side (hereinafter called "the first address") of first slots 15a, and inserted into a second position from the inner circumferential side (hereinafter called "the second address") of second slots 15a three slots away, and the coil segments 30 on an outer circumferential side are each inserted into a third position from the inner circumferential side (hereinafter called "the third address") of the first slots 15a, and inserted into a fourth position from the inner circumferential side (hereinafter called "the fourth address") of the second slots 15a three slots away. In other words, the coil segments 30 are housed within the sets of slots 15a three slots apart so as to form different layers.

Next, the free ends 30c of the coil segments 30 extending outwards at the front end are bent to open outwards (circumferentially outwards) so as to be at a constant angle relative to the direction of the grooves of the slots 15a, and in addition, the free ends 30c are each bent so as to extend in the same axial direction as the stator core 15. Then, with apex portions of the turn portions 30b of each of the coil segments 30 positioned so as to be at the same height, the free ends 30c of the coil segments 30 extending outwards at the front end from the first address within the slots 15a and the free ends 30c of the coil segments 30 extending outwards at the front end from the second address within the slots 15a three slots away are stacked radially and joined by welding. Thus, two inner circumferential coils are obtained by connecting in series a number of the coil segments 30 which are housed in a first slot group constituted by every third slot 15a.

Similarly, the free ends 30c of the coil segments 30 extending outwards at the front end from the third address within the slots 15a and the free ends 30c of the coil segments 30 extending outwards at the front end from fourth address within the slots 15a three slots away are stacked radially and joined together by welding. Thus, two outer circumferential coils are obtained by connecting in series a number of the coil segments 30 which are housed in the first slot group constituted by every third slot 15a.

These inner circumferential and outer circumferential coils are connected in series to form one coil phase portion having four turns.

A number of coil segments 30 housed in a second slot group constituted by the slots 15a offset by one slot from the slots 15a of the first slot group are similarly connected to form one coil phase portion having four turns. In addition, a number of coil segments 30 housed in a third slot group constituted by the slots 15a offset by one slot from the slots 15a of the second slot group are similarly connected to form one coil phase portion having four turns. These three coil phase portions are connected into an alternating-current connection to form the stator coil 16.

In this manner, the stator 8 is obtained by winding the stator coil 16 into the stator core 15 as shown in FIG. 21.

At the front end of the stator core 15, the insulation coating is stripped from the free ends 30c of the coil segments 30 in advance, as shown in FIGS. 23 and 24, and the free ends 30c of the coil segments 30 are stacked on top of one another radially then arc welded from above, aiming at a contact point A between pairs. Thus, pairs of the coil segments 30 are electrically connected through melted portions 31 on upper portions of the free ends 30c. Coil ends are formed by a connection pattern in which electrical conductors in different addresses in pairs of slots three slots apart are connected in series, the connection pattern being obtained by bending and welding together the free ends 30c of the coil segments 30 extending outwards from the pairs of slots three slots apart. These coil ends are arranged around the stator core 15 with a predetermined pitch in a circumferential direction to constitute a front-end coil end group 16f. Thus, cooling air deflected centrifugally by the fans 5 enters the front-end coil end group 16f through gaps between the coil ends and flows smoothly along the surfaces of the electrical conductors which form the coil ends, effectively cooling the front-end coil end group 16f.

At the same time, at the rear end of the stator core 15, coil ends are formed by a connection pattern in which electrical conductors in different addresses in pairs of slots three slots apart are connected in series, the connection pattern being obtained by the turn portions 30b of the coil segments 30. These coil ends are arranged around the stator core 15 with a predetermined pitch in a circumferential direction to constitute a rear-end coil end group 16r. Thus, cooling air deflected centrifugally by the fans 5 enters the rear-end coil end group 16r through gaps between the coil ends and flows smoothly along the surfaces of the electrical conductors which form the coil ends, effectively cooling the rear-end coil end group 16r.

Because automotive alternators equipped with stators 8 constructed in this manner are installed in engines with a high degree of vibration, the failures described below have occurred easily, leading to problems of reduced reliability and performance.

First, the insulation coating is stripped from the free ends 30c of the coil segments 30. Because the turn portions 30b of the coil segments 30 are formed by bending short segments of copper wire material coated with an insulation coating, bending stress is concentrated at the apex portions of the turn portions 30b, increasing the likelihood of damage to the insulation coating. Because the stator coil 16 has electrical potential during power generation and the coil end groups 16f and 16r are in close proximity to the brackets which are earthed, there is a risk that electrolytic corrosion will occur on exposed portions of the electrical conductors at the apex portions of the turn portions 30b and at the free ends 30c, leading to wire breakages due to vibration.

Furthermore, because the free ends 30c are joined together by arc welding, the melted portions 31 are formed so as to protrude. In other words, the melted portions 31 rise up from end surfaces of the free ends 30c and jut out horizontally. Thus, the spacing S2 between the joint portions of the free ends 30c becomes narrower and there is a risk of layer short-circuiting due to vibration. In addition, if layer short-circuiting occurs during power generation, stator current is disturbed, thereby also disturbing a magnetic flux wave form in an air gap between the stator 8 and the rotor 7 which is a factor causing magnetic attraction. Thus, magnetic attraction increases, giving rise to excessive electromagnetic noise.

Furthermore, the welded portions of the free ends 30c may be dislodged by vibration, or cracking may occur, increasing connection resistance, thereby making the temperature of the stator coil 16 excessively high.

In addition, because the front-end coil end group 16f is positioned on a side of the fans 5 where the cooling air is discharged, wind noise occurs due to unpleasant high-order interference noise arising between the shoulder portions of the claw-shaped magnetic poles 22 and 23 and the fans 5 due to the complexly-shaped melted portions 31.

SUMMARY OF THE INVENTION

The present invention aims to solve the above problems and an object of the present invention is to provide a stator for an alternator in which reliability and performance can be improved without reducing cooling of the coil end groups by eliminating exposure of the electrical conductors by applying an electrically-insulating resin portion to the apex portions of the coil ends.

In order to achieve the above object, according to one aspect of the present invention, there is provided a stator for an alternator, the stator including:

a cylindrical stator core formed with a number of slots extending axially at a predetermined pitch in a circumferential direction; and a stator coil installed in the stator core, the stator coil including a number of winding sub-portions, each of the winding sub-portions being installed in the stator core by housing electrically-insulated strands of wire in slots a predetermined number of slots apart so as to form different layers relative to a slot depth direction and connecting the different layers in the slots the predetermined number of slots apart to each other in series outside the slots in a predetermined connection pattern to form coil ends, the coil ends being aligned and mutually spaced circumferentially to constitute two coil end groups of the stator coil, an electrically-insulating resin portion being formed by applying a resin so as to cover surfaces of apex portions of the coil ends constituting at least one of the two coil end groups while ensuring air passage spaces between circumferentially-adjacent coil ends.

The coil ends in each of the two coil end groups may be arranged circumferentially around the stator core so as to line up in two rows radially.

The apex portions of the coil ends may be arranged in a zigzag formation.

Spaces between the radially adjacent apex portions of the coil ends of the stator core may be filled by the electrically-insulating resin portion.

The strands of wire may be formed with a flat cross sectional shape.

The electrically-insulating resin portion may be formed on the apex portions of the coil ends by painting.

The electrically-insulating resin portion may be formed on the apex portions of the coil ends by spray painting.

The electrically-insulating resin portion may be formed on the apex portions of the coil ends by a fluid bed coating method.

The resin used in the electrically-insulating resin portion may have as its main component an epoxy resin having a predetermined viscosity such that the resin does not spread from the apex portions of the coil ends or adhere to portions of the strands of wire other than the apex portions while drying or setting.

A single-component resin setting at room temperature may be used for the electrically-insulating resin portion.

A two-component resin setting at room temperature may be used for the electrically-insulating resin portion.

A thermosetting epoxy resin powder paint may be used for the electrically-insulating resin portion.

The strands of wire may be composed of coil segments being electrically-insulated electrical conductors formed into a general U shape, and each of the winding sub-portions may be constructed by inserting the coil segments into slots a predetermined number of slots apart so as to form different layers relative to a slot depth direction and bending and joining free ends of the coil segments extending from the slots the predetermined number of slots apart requiring connection to each other.

The U-shaped coil segments may be inserted into the slots from one axial end of the stator core.

The strands of wire may be continuous wires composed of electrically-insulated electrical conductors.

The winding sub-portions may be constituted by at least one winding assembly composed of a pair of first and second winding groups, the first winding group including a number of first winding sub-portions each having one turn constructed by winding one of the electrically-insulated strands of wire so as to fold back outside the slots at axial end surfaces of the stator core and alternately occupy an inner layer and an outer layer in a slot depth direction within the slots at intervals of the predetermined number of slots, the first winding sub-portions being disposed at a pitch of one slot from each other and being equal in number to the predetermined number of slots, and the second winding group including a number of second sub-portions each having one turn constructed by winding one of the strands of wire so as to fold back outside the slots at axial end surfaces of the stator core and alternately occupy an inner layer and an outer layer in a slot depth direction within the slots at intervals of the predetermined number of slots and so as to be inversely wound and offset by an electrical angle of 180° relative to the first sub-portions, the second sub-portions being disposed at a pitch of one slot from each other and being equal in number to the predetermined number of slots.

BRIEF DESCRIPTION OF THE DRAWINGS

FIG. 15A is an end elevation of an outer-layer winding assembly constituting part of the stator coil in the stator for an alternator according to Embodiment 6 of the present invention;

FIG. 15B is a plan of the outer-layer winding assembly constituting part of the stator coil in the stator for an alternator according to Embodiment 6 of the present invention;

DETAILED DESCRIPTION OF THE PREFERRED EMBODIMENTS

The preferred embodiments of the present invention will now be explained with reference to the drawings.

Embodiment 1

Figure 1:
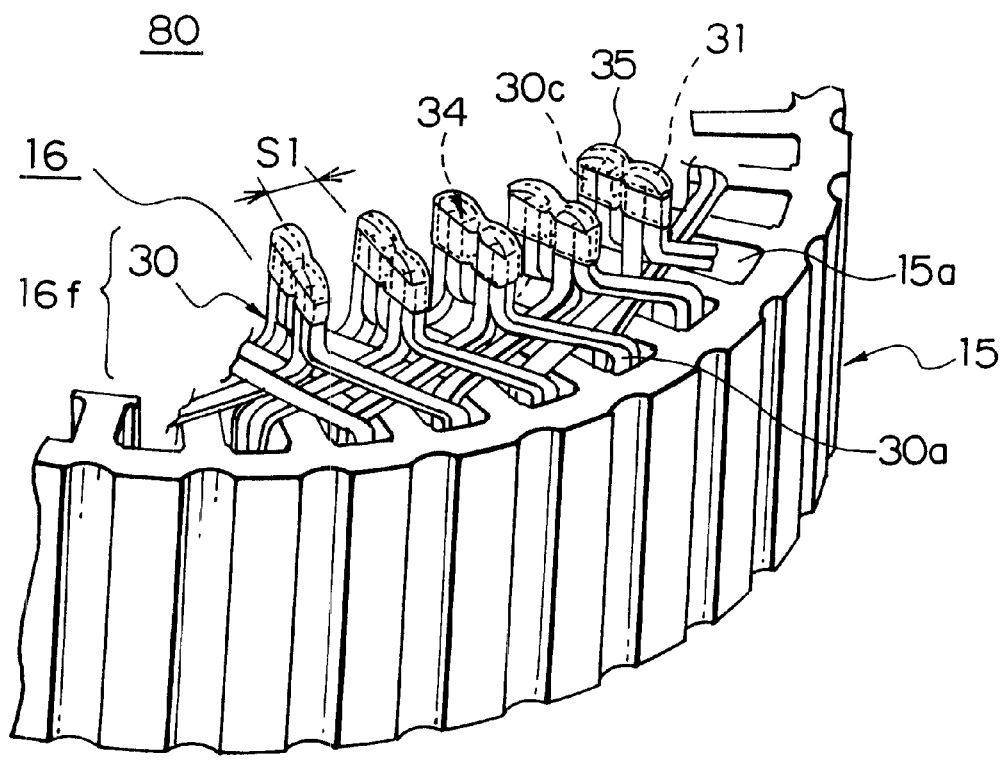
FIG. 1 is a partial perspective of a stator for an alternator according to Embodiment 1 of the present invention viewed from a front end.
Figure 2:
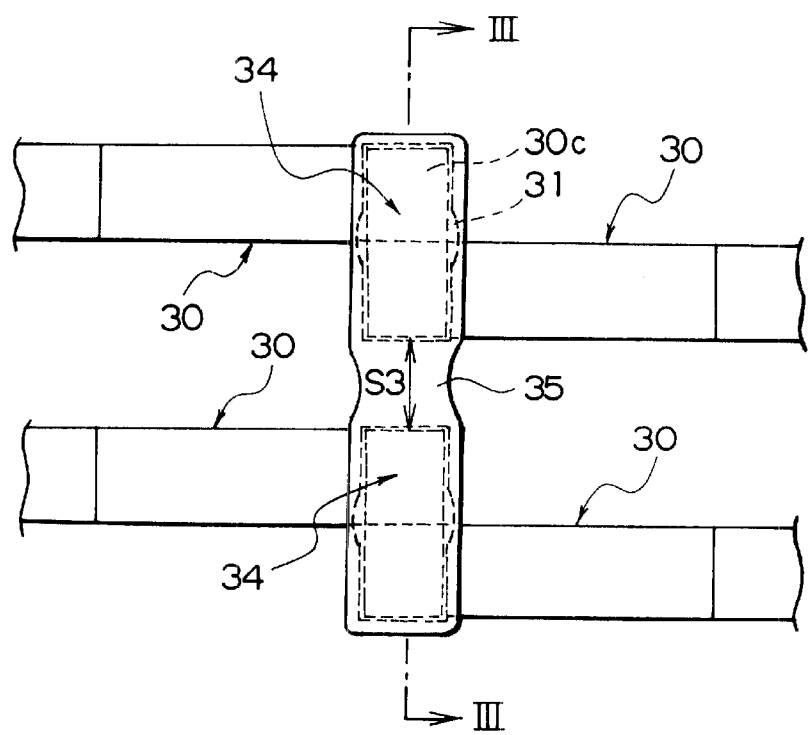
FIG. 2 is a partial enlargement of this stator for an automotive alternator viewed from the front end.
Figure 3:
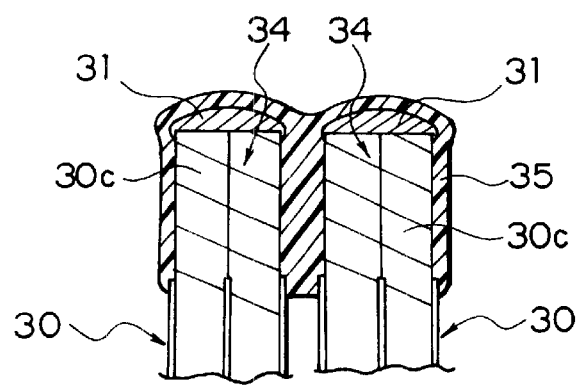
FIG. 3, is a cross section taken along line III—III in FIG. 2 viewed from the direction of the arrows.

FIG. 1 is a partial perspective of a stator for an alternator according to Embodiment 1 of the present invention viewed from a front end, FIG. 2 is a partial enlargement of this stator for an automotive alternator viewed from the front end, and FIG. 3 is a cross section taken along line III—III in FIG. 2 viewed from the direction of the arrows. Moreover, in each of the figures, portions identical to those of the conventional stator shown in FIGS. 20 to 24 will be given the same numbering and explanation thereof will be omitted.

In each figure, electrically-insulating resin portions 35 having as their main component an epoxy resin with a heat resistance temperature of 200° C. are applied so as to cover the joint portions 34 joining the free ends 30c of the coil segments 30, that is, surfaces of the melted portions 31 and portions of the free ends 30c from which the insulation coating has been stripped. In addition, the electrically-insulating resin portions 35 are applied so as to fill spaces S3 between radially-adjacent joint portions 34 joining the free ends 30c together.

Moreover, the rest of the construction is constructed similarly to the conventional stator 8.

In the stator 80 constructed in this manner, a film thickness of the electrically-insulating resin portions 35 is uniformly ensured to be approximately 60 μm on surfaces of the joint portions 34 joining the free ends 30c together. Thus, because spaces S2 (see FIG. 21) between circumferentially-adjacent joint portions 34 joining the free ends 30c together are set at 2 to 3 mm before applying the electrically-insulating resin portions 35, separation spaces having that value minus 120 μm are ensured as air passage spaces S1.

In order to ensure the film thickness of the electrically-insulating resin portions 35 on the surfaces of the joint portions 34 joining the free ends 30c together, and in order to fill the spaces between the joint portions 34 joining the radially-adjacent free ends 30c together with the electrically-insulating resin portions 35, the applied electrically-insulating resin is adjusted to a predetermined viscosity. In other words, the electrically-insulating resin portions 35 used have as their main component an epoxy resin having a predetermined viscosity such that the electrically-insulating resin does not spread or adhere to portions of the coil segments 30 other than the joint portions while drying or setting.

Next, the method of applying the electrically-insulating resin portions 35 will be explained with reference to FIG. 4.

A single-component paint setting at room temperature, for example, a quick-drying paint (drying in 15 to 25 seconds) having an epoxy resin paint as its base and being diluted to a thinner content ratio of 50 percent, was used for the electrically-insulating resin portions 35.

Masking was applied to all portions of the coil segments 30 except for the joint portions 34, as well as to portions of the stator core 15. Thereafter, spray painting was performed by blowing the paint from a radial direction onto the front-end coil end group 16f of the stator coil 16, as indicated by the arrows in FIG. 4.

Here, in spray painting from a radial direction, the electrically-insulating resin does not easily adhere to side surfaces facing the spaces S3 between the joint portions 34, but because the spaces S3 between the radially-adjacent joint portions 34 are in the order of 1 mm, the electrically-insulating resin portions 35 easily fill the spaces S3 as they are applied. Moreover, in cases where the spaces S3 are not sufficiently filled by the electrically-insulating resin portions 35, spray painting may be performed separately to fill the spaces S3 with the electrically-insulating resin portions 35.

Thus, according to Embodiment 1, because the electrically-insulating resin portions 35 are applied so as to cover the joint portions 34 joining the free ends 30c which are apex portions of the coil ends constituting the front-end coil end group 16f, that is, the surfaces of the melted portions 31 and portions of the free ends 30c from which the insulation coating has been stripped, exposure of the electrical conductors in the coil ends constituting the front-end coil end group 16f is eliminated.

Thus, it was possible to extend the time before output drops due to electrolytic corrosion in corrosion tests to twice that of the conventional stator 8.

Consequently, the occurrence of wire breakages as a result of vibration is suppressed, enabling reliability to be improved.

Because the joint portions 34 are reliably insulated, short circuiting between the joint portions 34 is prevented even if displacement is applied thereto due to vibration or external force. Thus, because disturbances of the magnetic flux wave form in an air gap between the stator 80 and the rotor 7 resulting from layer short-circuiting are eliminated, that is, increases in magnetic attraction resulting from layer short-circuiting are suppressed, excessive electromagnetic noise no longer occurs.

Because the spaces S2 between the circumferentially-adjacent joint portions 34 are ensured and cooling air can flow through the spaces S2, there is no loss of cooling in the stator coil 16.

Because the electrically-insulating resin portions 35 are disposed so as to fill the spaces S3 between the radially-adjacent joint portions 34, rigidity of the coil ends constituting the front-end coil end group 16f is increased. Consequently, dislodgement of the joint portions 34 joining the free ends 30c together due to vibration and increases in connection resistance due to the occurrence of cracking are suppressed, eliminating excessive temperature increases in the stator coil 16. In addition, interference from the cooling air flow in the spaces S3 between the radially-adjacent joint portions 34 is eliminated, reducing high-frequency components of unpleasant wind noise.

Because a single-component paint setting at room temperature is used, a drying furnace or the like is no longer necessary, enabling the electrically-insulating resin portions 35 to be formed at low cost.

Because the electrically-insulating resin portions 35 are applied by spray painting, which requires only simple equipment, the electrically-insulating resin portions 35 can be formed at low cost.

Because the paint is spray painted onto the front-end coil end group 16f from a radial direction, the resin flows in the same manner as the flow of the cooling air and adheres to the surfaces of the joint portions 34, enabling the electrically-insulating resin portions 35 to be formed to a uniform film thickness.

In addition, because the coil segments are formed with a flat cross-sectional shape, the electrically-insulating resin portions 35 can easily be formed to a uniform film thickness on the surfaces of the joint portions 34 compared to coil segments with a circular cross section, enabling insulation reliability to be increased.

Moreover, in Embodiment 1 above, a single-component paint setting at room temperature is used, but a two-component paint setting at room temperature may also be used. In that case, because setting does not begin until the two components are mixed, storage is improved and painting can be carried out simply.

In Embodiment 1 above, the electrically-insulating resin portions are applied and formed by spray painting, but the electrically-insulating resin portions may also be applied and formed using a brush.

Embodiment 2

In Embodiment 1 above, the electrically-insulating resin portions 35 are applied and formed on the apex portions of the coil ends by spray painting, but in Embodiment 2, the electrically-insulating resin portions 35 are applied and formed on the apex portions of the coil ends by a fluid bed coating method.

Figure 5:
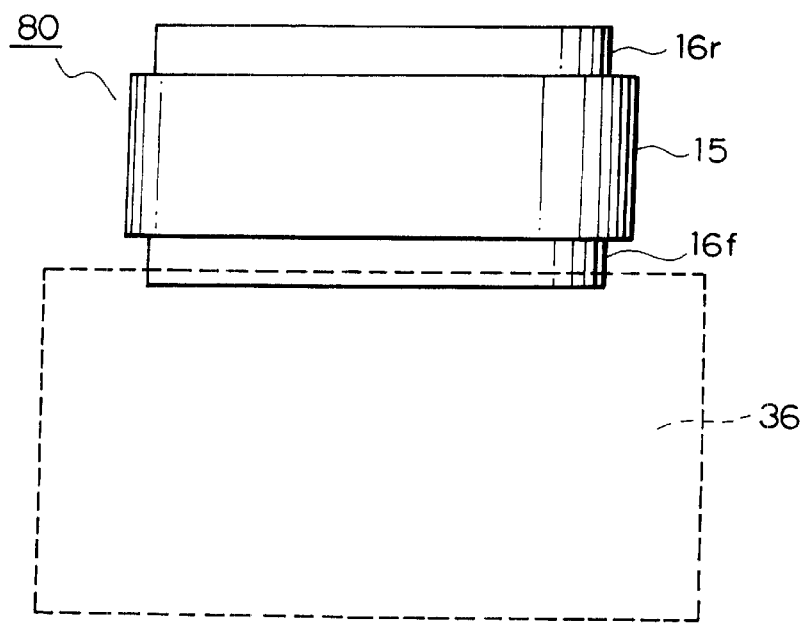
FIG. 5 is a schematic diagram explaining application of electrically-insulating resin portion in a stator for an automotive alternator according to Embodiment 2 of the present invention.

In Embodiment 2, as shown in FIG. 5, the electrically-insulating resin portions 35 are formed by immersing the front-end coil end group 16f of the stator coil 80 by a predetermined amount into a paint stored in liquid form in an immersion tank 36, then lifting it out and allowing it to dry and set, so as to cover the surfaces of the joint portions 34 and fill the spaces S3 between the radially-adjacent joint portions 34.

Consequently, because the electrically-insulating resin portions 35 do not adhere to other portions, it is not necessary to apply any masking, thereby improving the painting operation.

Moreover, in this fluid bed coating method, a single-component paint setting at room temperature may be used, but here a paint which sets at a high temperature has been used, for example, an epoxy resin powder paint having a setting temperature of 150° C. and a hardness after setting of 80 degrees, being allowed to dry and set for 30 minutes at 150° C. after fluid bed coating. Thus, viscosity is high, at flow rate of 5 to 3 percent, enabling the resin to be applied and formed so as to completely fill the spaces S3 without the resin dripping. Furthermore, because the paint setting at a high temperature is used, intermolecular bonding is improved, providing electrically-insulating resin portions with superior strength and heat resistance.

Embodiment 3

Figure 4:
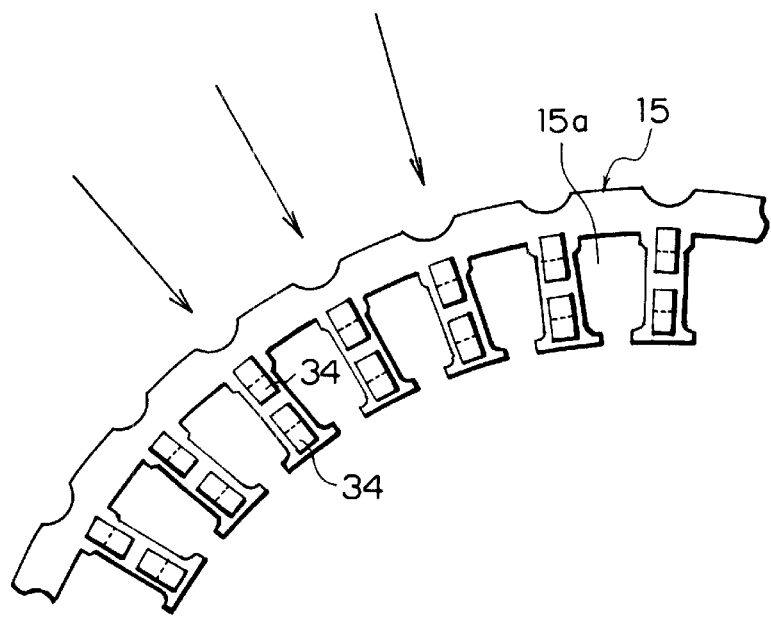
FIG. 4 is a schematic diagram explaining the application of electrically-insulating resin portion in the stator for an automotive alternator according to Embodiment 1 of the present invention.
Figure 6:
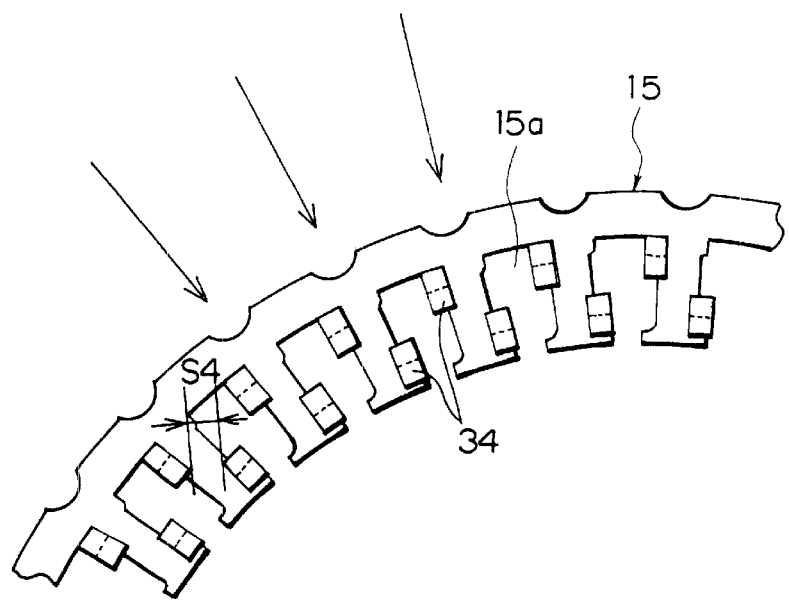
FIG. 6 is a partial end elevation explaining the arrangement of joint portions in a stator for an alternator according to Embodiment 3 of the present invention.

In Embodiment 1 above, as shown in FIG. 4, the joint portions 34 are arranged circumferentially to line up in two rows radially, but in Embodiment 3, as shown in FIG. 6, the joint portions 34 on an inner circumferential side and the joint portions 34 on an outer circumferential side are arranged in a zigzag formation by being offset in a circumferential direction, and the electrically-insulating resin is applied to the joint portions 34 by spray painting from a radial direction, as indicated by the arrows in FIG. 6.

In this case, because the joint portions 34 are arranged in a zigzag formation, the electrically-insulating resin portions are formed so as to reliably cover all sides of the joint portions 34, raising insulation reliability.

Moreover, in Embodiment 3 also, spaces S4, shown in FIG. 6, may be filled with the electrically-insulating resin while ensuring spaces between circumferentially-adjacent joint portions 34.

At this time, by filling the spaces between the electrically-insulating resin portions formed so as to cover all sides of the joint portions 34 with electrically-insulating resin so as to form air passage channels which are inclined in the direction of rotation of the rotor, increased wind resistance against the cooling air flow generated by the fans can be suppressed, providing additional noise reducing effect and also providing a straightening effect for the cooling air flow, thereby improving cooling.

Embodiment 4

Figure 7:
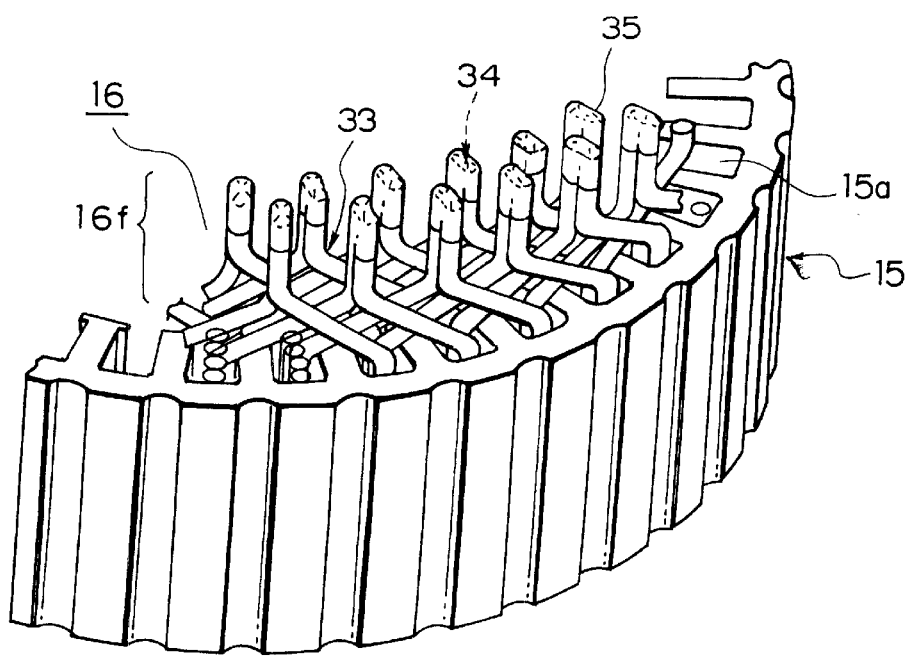
FIG. 7 is a partial perspective of a stator for an alternator according to Embodiment 4 of the present invention viewed from the front end.

In Embodiment 4, as shown in FIG. 7, a stator coil is prepared using coil segments 33 having a circular cross section. Moreover, Embodiment 4 is constructed similarly to Embodiment 3 above except for the fact that the coil segments 33 having a circular cross section are used instead of the coil segments 30 having a flat cross section,.

Consequently, the same effects as in Embodiment 3 above can also be obtained in Embodiment 4.

Embodiment 5

Figure 8:
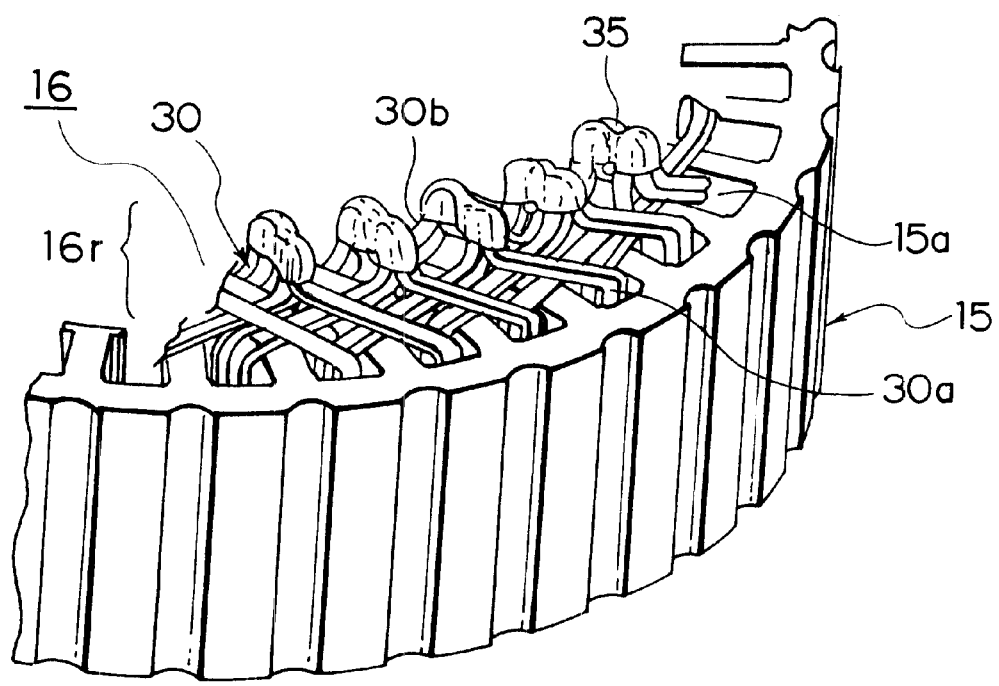
FIG. 8 is a partial perspective of a stator for an alternator according to Embodiment 5 of the present invention viewed from a rear end.

FIG. 8 is a partial perspective of a stator for an alternator according to Embodiment 5 of the present invention viewed from a rear end.

In FIG. 8, the electrically-insulating resin portions 35 are applied so as to cover surfaces of the apex portions of each of the coil ends constituting the rear-end coil end group 16r, that is, the apex portions of the turn portions 30b of the coil segments 30. In addition, the electrically-insulating resin portions 35 are applied so as to fill spaces between the apex portions of radially-adjacent turn portions 30b.

Moreover, the rest of the construction is constructed similarly to Embodiment 1 above. In other words, the electrically-insulating resin portions 35 are applied so as to cover the surfaces of the apex portions of each of the coil ends constituting the front-end coil end group 16f, that is to say, the joint portions 34, and to fill the spaces between the radially-adjacent joint portions 34.

Consequently, in Embodiment 5, exposure of the electrical conductors in each of the coil ends constituting the front-end coil end group 16f is eliminated, and because the damaged portions of the insulation coating which arise on the apex portions of the turn portions 30b which are formed by bending are covered by the electrically-insulating resin portions 35, exposure of the electrical conductors in each of the coil ends constituting the rear-end coil end group 16r is eliminated.

Thus, corrosion of the coil due to electrolytic corrosion is also suppressed in the rear-end coil end group 16r, improving reliability proportionately.

Because the turn portions 30b in the rear-end coil end group 16r are also reliably insulated, short circuiting between the turn portions 30b is prevented even if displacement is applied thereto due to vibration or external force. Thus, because disturbances of the magnetic flux wave form in the air gap between the stator 80 and the rotor 7 resulting from layer short-circuiting are eliminated, that is, increases in magnetic attraction resulting from layer short-circuiting are suppressed, excessive electromagnetic noise no longer occurs.

Because the spaces between the circumferentially-adjacent turn portions 30b are ensured and cooling air can flow through the spaces, there is no loss of cooling in the stator coil 16.

Because the electrically-insulating resin portions 35 are disposed so as to fill the spaces between the radially-adjacent turn portions 30b, rigidity of the coil ends constituting the rear-end coil end group 16r is increased. In addition, interference from the cooling air flow in the spaces between the radially-adjacent turn portions 30b is eliminated, reducing high-frequency components of unpleasant wind noise.

Embodiment 6

Embodiments 1 to 5 above apply to a stator coil which is prepared using short U-shaped coil segments 30 and 33, but Embodiment 6 applies to a stator coil which is prepared using long strands of wire.

Figure 9:
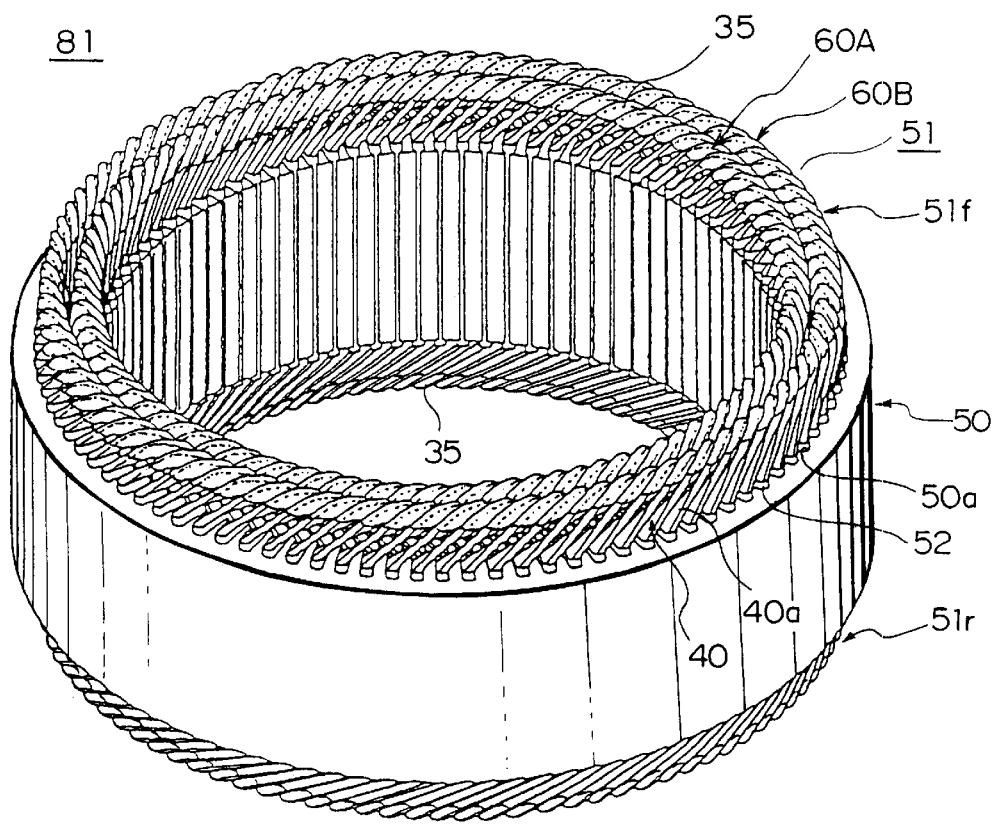
FIG. 9 is a perspective showing a stator for an alternator according to Embodiment 6 of the present invention.

FIG. 9 is a perspective showing a stator for an alternator according to Embodiment 6 of the present invention, connection portions such as crossover connections being omitted from the figure to simplify explanation.

In FIG. 9, a stator 81 includes: a stator core 50 composed of a cylindrical laminated core formed with a number of slots 50a extending axially at a predetermined pitch in a circumferential direction; a stator coil 51 installed in the stator core 50; and insulators 52 disposed inside the slots 50a, the insulators 52 ensuring electrical insulation of the stator coil 51 from the stator core 50. The stator coil 51 has coil end groups 51f and 51r which extend outwards from the front end and the rear end of the stator core 50, respectively, and the electrically-insulating resin portions 35 are disposed so as to cover surfaces of apex portions of coil ends constituting the coil end groups 51f and 51r, and to fill spaces between the apex portions of radially-adjacent coil ends. Moreover, spaces between circumferentially-adjacent coil ends are ensured.

Furthermore, the stator coil 51 is provided with two winding assemblies 60A and 60B disposed in two rows radially. The winding assemblies 60A and 60B are each constituted by a number of winding sub-portions in each of which one strand of wire 40 is bent back outside the slots 50a at end surfaces of the stator core 50 and wound into a wave winding so as to alternately occupy an inner layer and an outer layer in a slot depth direction within slots 50a a predetermined number of slots apart. In this case, the stator core 50 is formed with ninety-six slots 50a at even pitch so as to house two three-phase stator winding portions 53 (described below) such that the number of slots housing each stator winding phase group corresponds to the number of magnetic poles (sixteen) in the rotor 7. Continuous wire of a copper wire material having a flat cross section coated with an insulation coating, for example, is used in the strands of wire 40.

Figure 10:
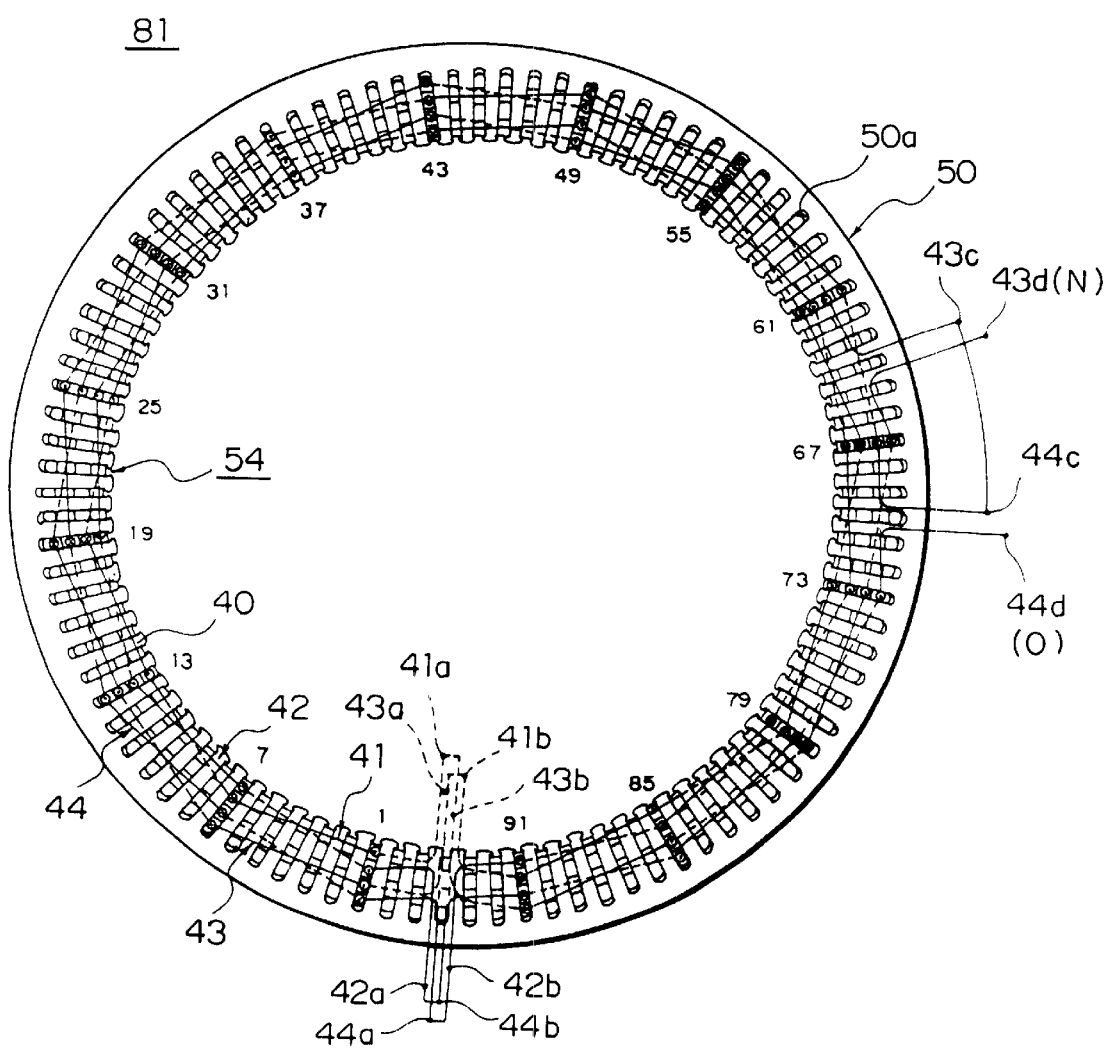
FIG. 10 is an end elevation explaining connections in one stator winding phase group in the stator for an alternator according to Embodiment 6 of the present invention.

Next, the winding construction of one stator winding phase group 54 will be explained in detail with reference to FIG. 10. Moreover, in FIG. 10, the wiring at a first end of the stator core 50 is indicated by solid lines, and the wiring at a second end by broken lines.

One stator winding phase group 54 is constituted by first to fourth winding sub-portions 41 to 44 each formed from one strand of wire 40. The first winding sub-portion 41 is constructed by wave winding one strand of wire 40 into every sixth slot from slot numbers 1 to 91 so as to alternately occupy a first position from an inner circumferential side (a first address) and a second position from the inner circumferential side (a second address) inside the slots 50a. The second winding sub-portion 42 is constructed by wave winding a strand of wire 40 into every sixth slot from slot numbers 1 to 91 so as to alternately occupy the second address and the first address inside the slots 50a. The third winding sub-portion 43 is constructed by wave winding a strand of wire 40 into every sixth slot from slot numbers 1 to 91 so as to alternately occupy a third position from the inner circumferential side (a third address) and a fourth position from the inner circumferential side (a fourth address) inside the slots 50a. The fourth winding sub-portion 44 is constructed by wave winding a strand of wire 40 into every sixth slot from slot numbers 1 to 91 so as to alternately occupy the fourth address and the third address inside the slots 50a.

Thus, the first to fourth winding sub-portions 41 to 44 each constituted a winding sub-portion having one turn in which one strand of wire 40 is wound into every sixth slot 50a so as to alternately occupy an inner layer and an outer layer in a slot depth direction. The strands of wire 40 are arranged to line up radially in a row of four strands within each slot 50a with the longitudinal direction of their flat cross sections (rectangular cross sections) aligned in a radial direction.

At the first end of the stator core 50, a first end portion 42a of the second winding sub-portion 42 extending outwards from the second address of slot number 1 and a second end portion 44b of the fourth winding sub-portion 44 extending outwards from the third address of slot number 91 are joined, and in addition, a first end portion 44a of the fourth winding sub-portion 44 extending outwards from the fourth address of slot number 1 and a second end portion 42b of the second winding sub-portion 42 extending outwards from the first address of slot number 91 are joined to form two turns of winding.

At the second end of the stator core 50, a first end portion 41a of the first winding sub-portion 41 extending outwards from the first address of slot number 1 and a second end portion 43b of the third winding sub-portion 43 extending outwards from the fourth address of slot number 91 are joined, and in addition, a first end portion 43a of the third winding sub-portion 43 extending outwards from the third address of slot number 1 and a second end portion 41b of the first winding sub-portion 41 extending outwards from the second address of slot number 91 are joined to form two turns of winding.

In addition, a portion of the strand of wire 40 of the third winding sub-portion 43 extending outwards at the first end of the stator core 50 from the third address of slot number 61 and the fourth address of slot number 67 is cut, and a portion of the strand of wire 40 of the fourth winding sub-portion 44 extending outwards at the first end of the stator core 50 from the third address of slot number 67 and the fourth address of slot number 73 is also cut. A first cut end 43c of the third winding sub-portion 43 and a first cut end 44c of the fourth winding sub-portion 44 are joined to form one stator winding phase group 54 having four turns connecting the first to fourth winding sub-portions 41 to 44 in series.

Moreover, the joint portion between the first cut end 43c of the third winding sub-portion 43 and the first cut end 44c of the fourth winding sub-portion 44 becomes a crossover connection connecting portion, a second cut end 43d of the third winding sub-portion 43 and a second cut end 44d of the fourth winding sub-portion 44 become a neutral-point (N) and an output wire (O), respectively.

Figure 11:
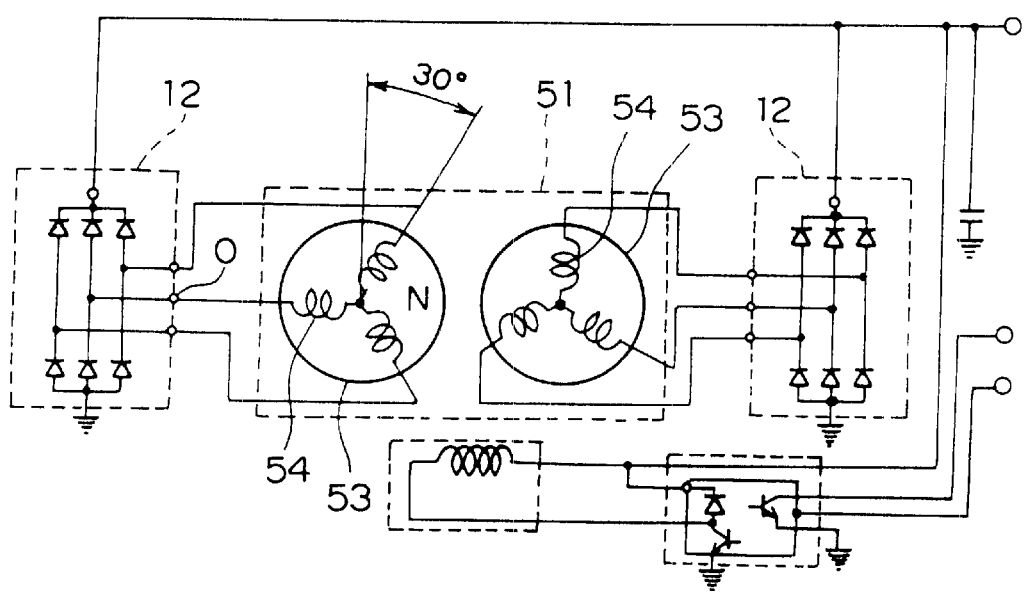
FIG. 11 is a circuit diagram for the stator for an alternator according to Embodiment 6 of the present invention.

A total of six stator winding phase groups 54 are similarly formed by offsetting by one slot at a time the slots 50a into which the strands of wire 40 are wound. Then, as shown in FIG. 11, three stator winding phase groups 54 are connected into each of two star connections to form the two three-phase stator winding portions 53, and each of the three-phase stator winding portions 53 is connected to its own rectifier 12. The rectifiers 12 are connected in parallel so that the direct-current output from each is combined.

Thus, the strands of wire 40 constituting the first to fourth winding sub-portions 41 to 44 are each wound into a wave winding so as to extend out of first slots 50a at end surfaces of the stator core 50, fold back, and enter second slots 50a six slots away. Each of the strands of wire 40 is wound so as to alternately occupy the inner layer and the outer layer relative to the slot depth direction (the radial direction) in every sixth slot. The first winding sub-portion 41 and the second winding sub-portion 42 are inversely wound and offset by an electrical angle of 180° relative to each other. Similarly, the third winding sub-portion 43 and the fourth winding sub-portion 44 are also inversely wound and offset by an electrical angle of 180° relative to each other.

Thin portions 40a of the strands of wire 40 extend outwards from the stator core 50 and fold back to form coil ends. The turn portions 40a which are formed into a substantially identical shape at both axial ends of the stator core 50 are mutually spaced circumferentially and radially, and arranged neatly in two rows circumferentially, to form front-end and rear-end coil end groups 51f and 51r.

Next, the assembly of the stator 81 will be explained with reference to FIGS. 12 to 19C.

Figure 12:
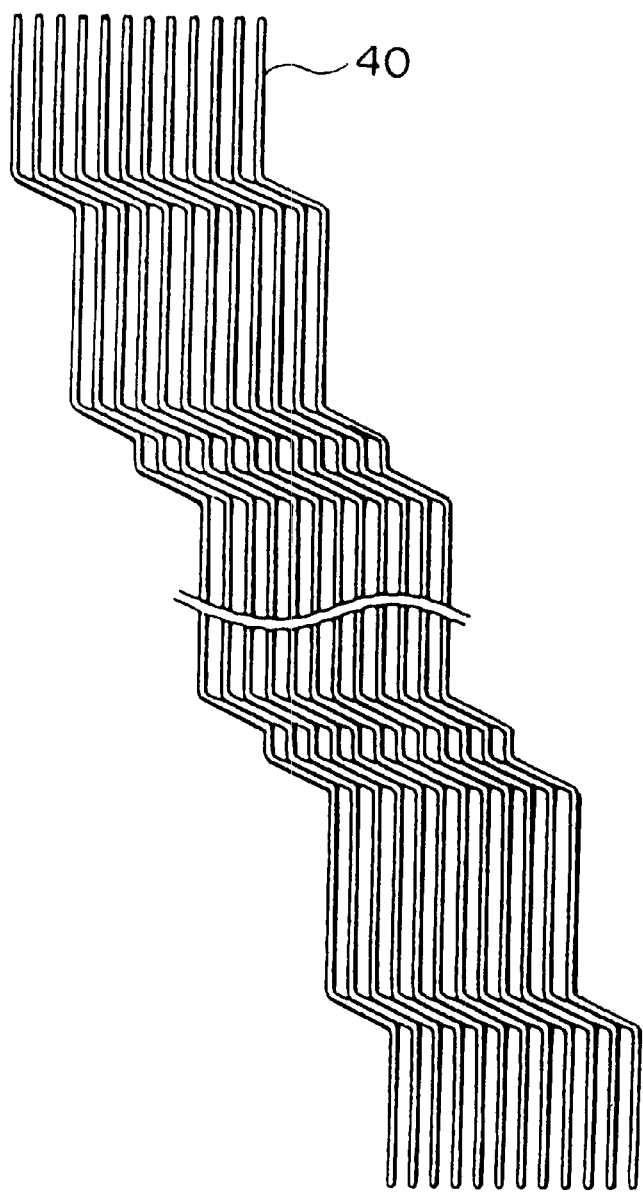
FIG. 12 is a diagram explaining a manufacturing process for a winding group constituting part of a stator coil in the stator for an alternator according to Embodiment 6 of the present invention.
Figure 13:
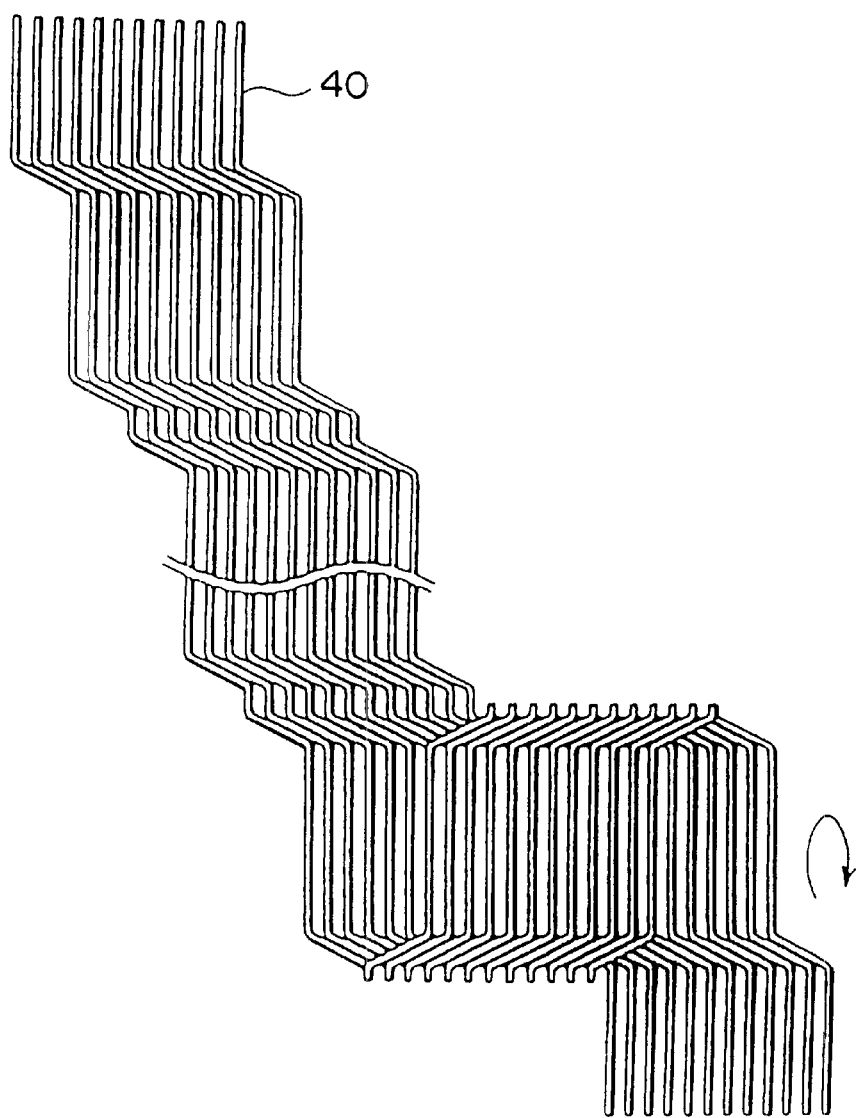
FIG. 13 is a diagram explaining a manufacturing process for the winding group constituting part of the stator coil in the stator for an alternator according to Embodiment 6 of the present invention.
Figures 14A, 14B:
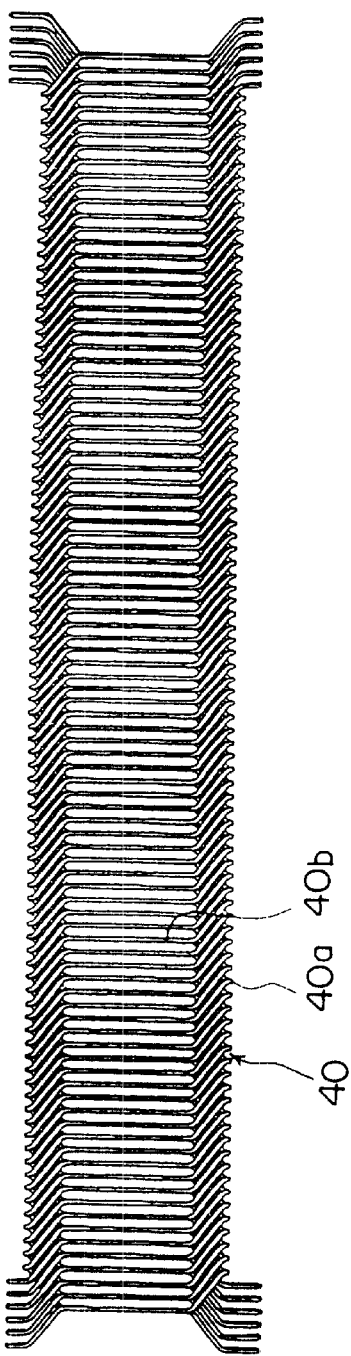
FIG. 14A is an end elevation of an inner-layer winding assembly constituting part of the stator coil in the stator for an alternator according to Embodiment 6 of the present invention.
FIG. 14B is a plan of the inner-layer winding assembly constituting part of the stator coil in the stator for an alternator according to Embodiment 6 of the present invention.

First, as shown in FIG. 12, twelve long strands of wire 40 are simultaneously bent in the same plane to form a lightning-bolt shape. Then, the winding assembly 60A shown in FIGS. 14A and 14B is prepared by progressively folding the strands at right angles, as indicated by the arrow in FIG. 13, using a jig. In addition, the winding assembly 60B, which has crossover connections and output wires as shown in FIGS. 15A and 15B, is prepared similarly.

Figure 16:
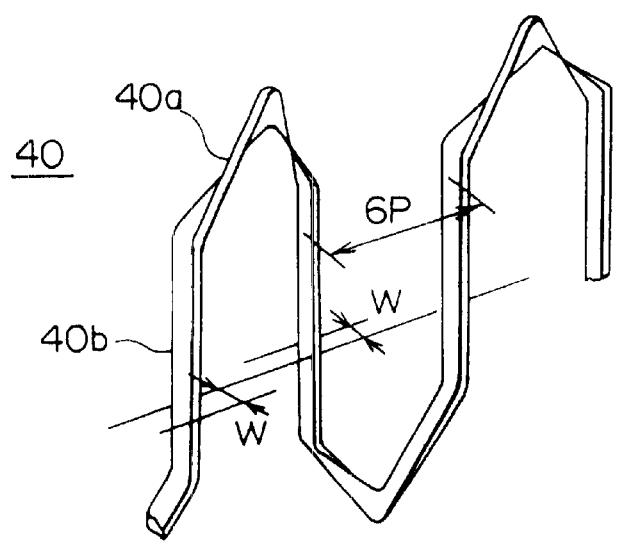
FIG. 16 is a perspective showing part of a strand of wire constituting part of the stator coil in the stator for an alternator according to Embodiment 6 of the present invention.
Figure 17:
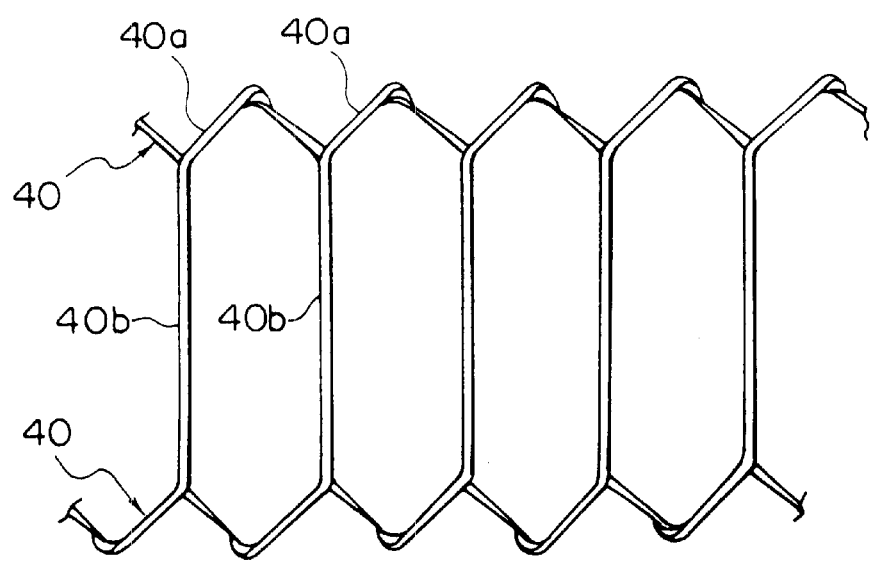
FIG. 17 is a diagram explaining arrangement of the strands of wire constituting part of the stator coil in the stator for an alternator according to Embodiment 6 of the present invention.

Moreover, as shown in FIG. 16, each strand of wire 40 is formed by bending it into a planar pattern in which straight portions 40b connected by turn portions 40a are lined up at a pitch of six slots (6P). Adjacent straight portions 40b are offset by a distance equal to one width (W) of the strands of wire 40 by means of the turn portions 40a. The winding assemblies 60A and 60B are constructed by arranging six wire-strand pairs so as to be offset by a pitch of one slot from each other, each wire-strand pair being composed of two strands of wire 40 formed in the above pattern which are offset by a pitch of six slots and arranged such that straight portions 40b overlap as shown in FIG. 17. Six end portions of the strands of wire 40 each extend outwards from first and second sides at first and second ends of the winding assemblies 60A and 60B. Furthermore, the turn portions 40a which constitute the coil ends are arranged so as to line up in rows on first and second side portions of the winding assemblies 60A and 60B.

Figure 18:
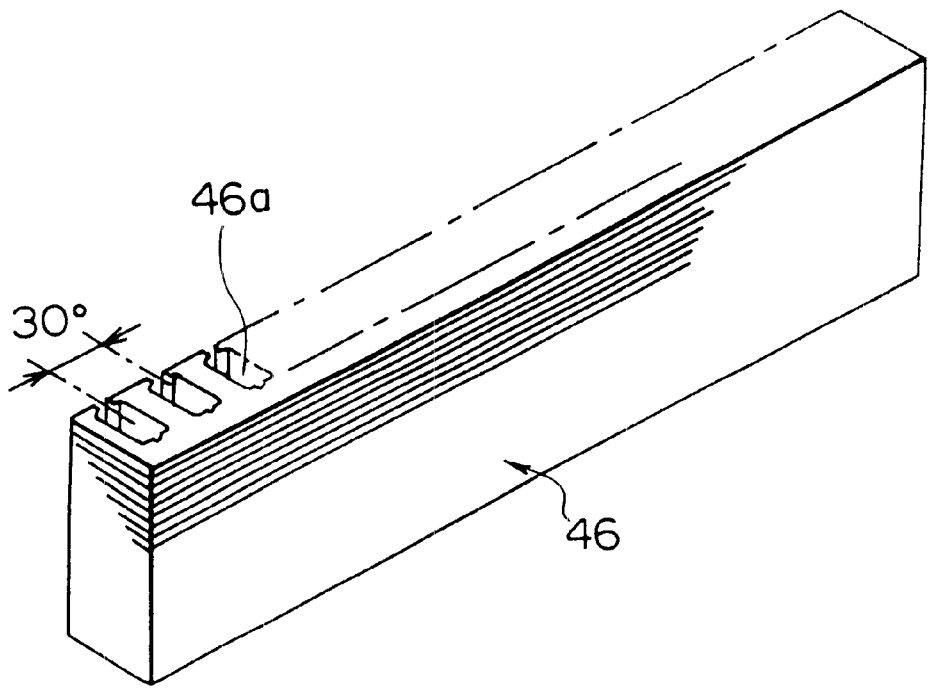
FIG. 18 is a perspective showing a laminated core constituting a stator core in the stator for an alternator according to Embodiment 6 of the present invention.

Meanwhile, the parallelepiped laminated core 46 is prepared as shown in FIG. 18 by laminating a predetermined number of sheets of SPCC material which is a magnetic material formed with trapezoidal slots 46a at a predetermined pitch (an electrical angle of 30°) and laser welding an outer portion thereof.

Figure 19A:
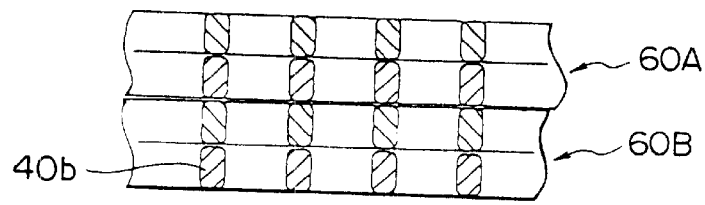
FIG. 19A is a cross section explaining a manufacturing process for the stator for an alternator according to Embodiment 6 of the present invention.
Figure 19B:
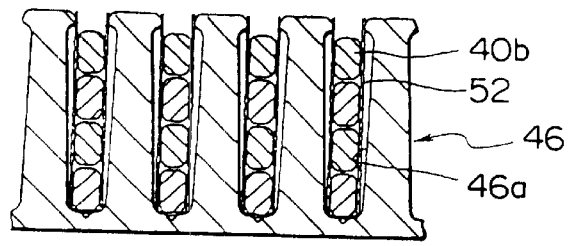
FIG. 19B is a cross section explaining the manufacturing process for the stator for an alternator according to Embodiment 6 of the present invention.

As shown in FIG. 19A, the insulators 52 are mounted in the slots 46a of the parallelepiped laminated core 46, and the straight portions of the two winding assemblies 60A and 60B are inserted so as to stack up within each of the slots 46a. Thus, the two winding assemblies 60A and 60B are installed in the parallelepiped laminated core 46 as shown in FIG. 19B. At this time, the straight portions 40b of the strands of wire 40 are housed in lines of four in a radial direction within the slots 46a and are electrically insulated from the parallelepiped laminated core 46 by the insulators 52. The two winding assemblies 60A and 60B are stacked one on top of the other when installed in the parallelepiped laminated core 46.

Figure 19C:
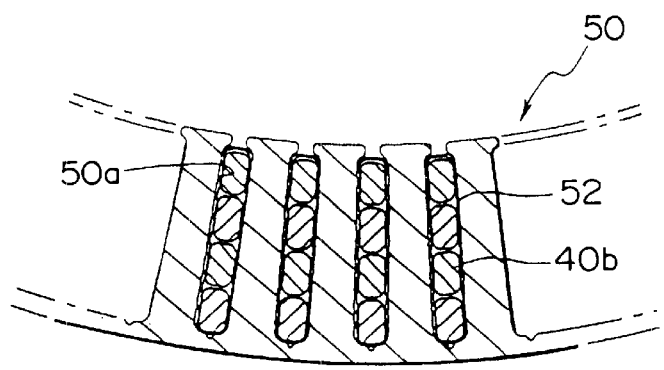
FIG. 19C is a cross section explaining the manufacturing process for the stator for an alternator according to Embodiment 6 of the present invention.
Figure 20:
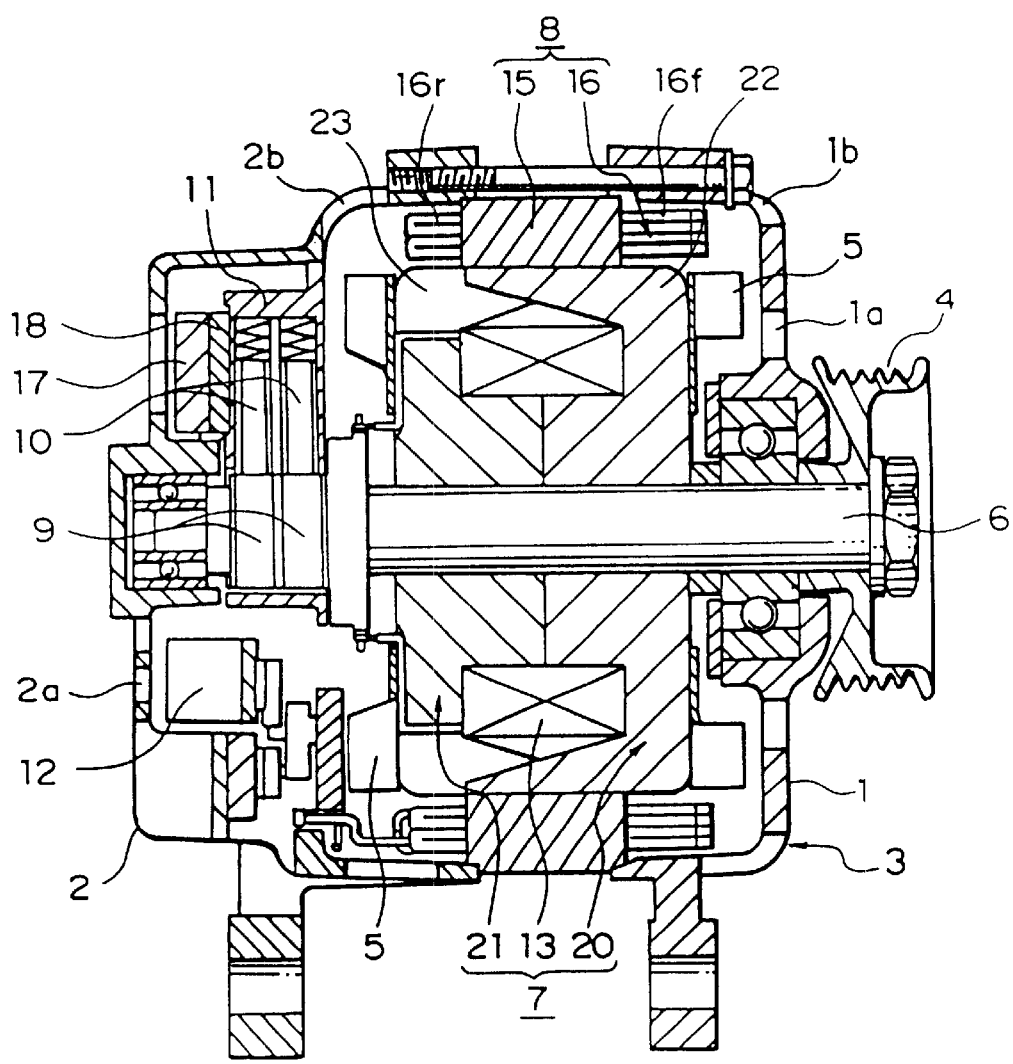
FIG. 20 is a cross section showing a construction of a conventional stator for an alternator.
Figure 21:
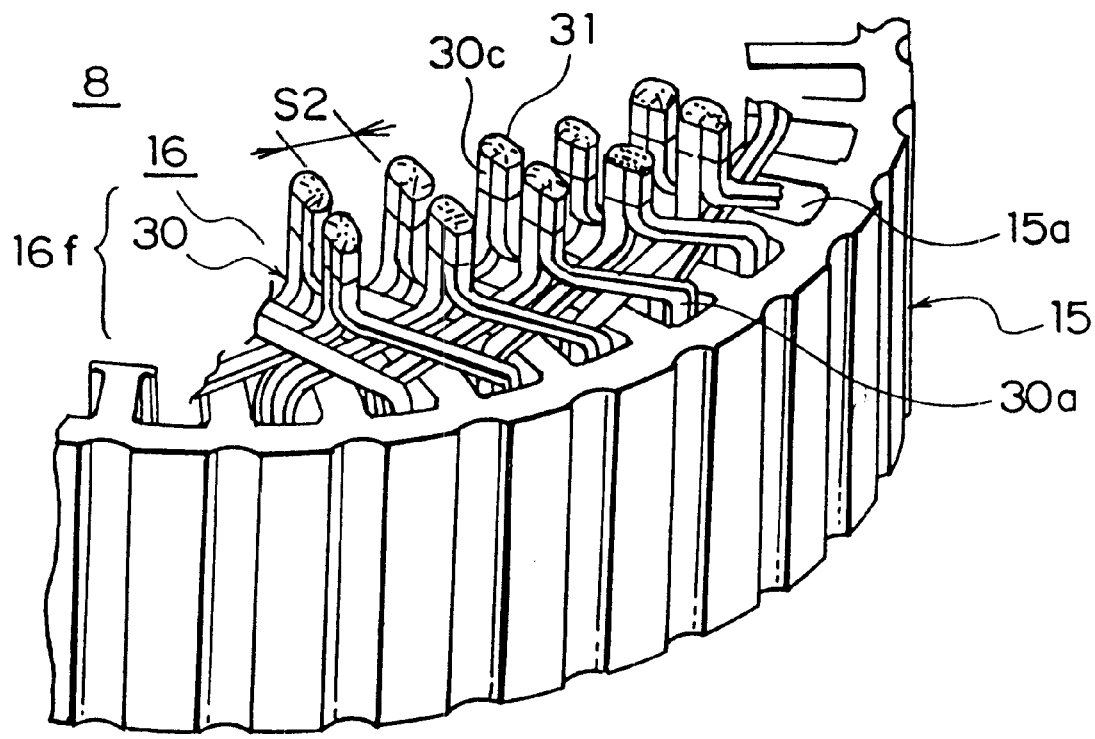
FIG. 21 is a partial perspective of the conventional stator for an alternator viewed from the front end.
Figure 22:
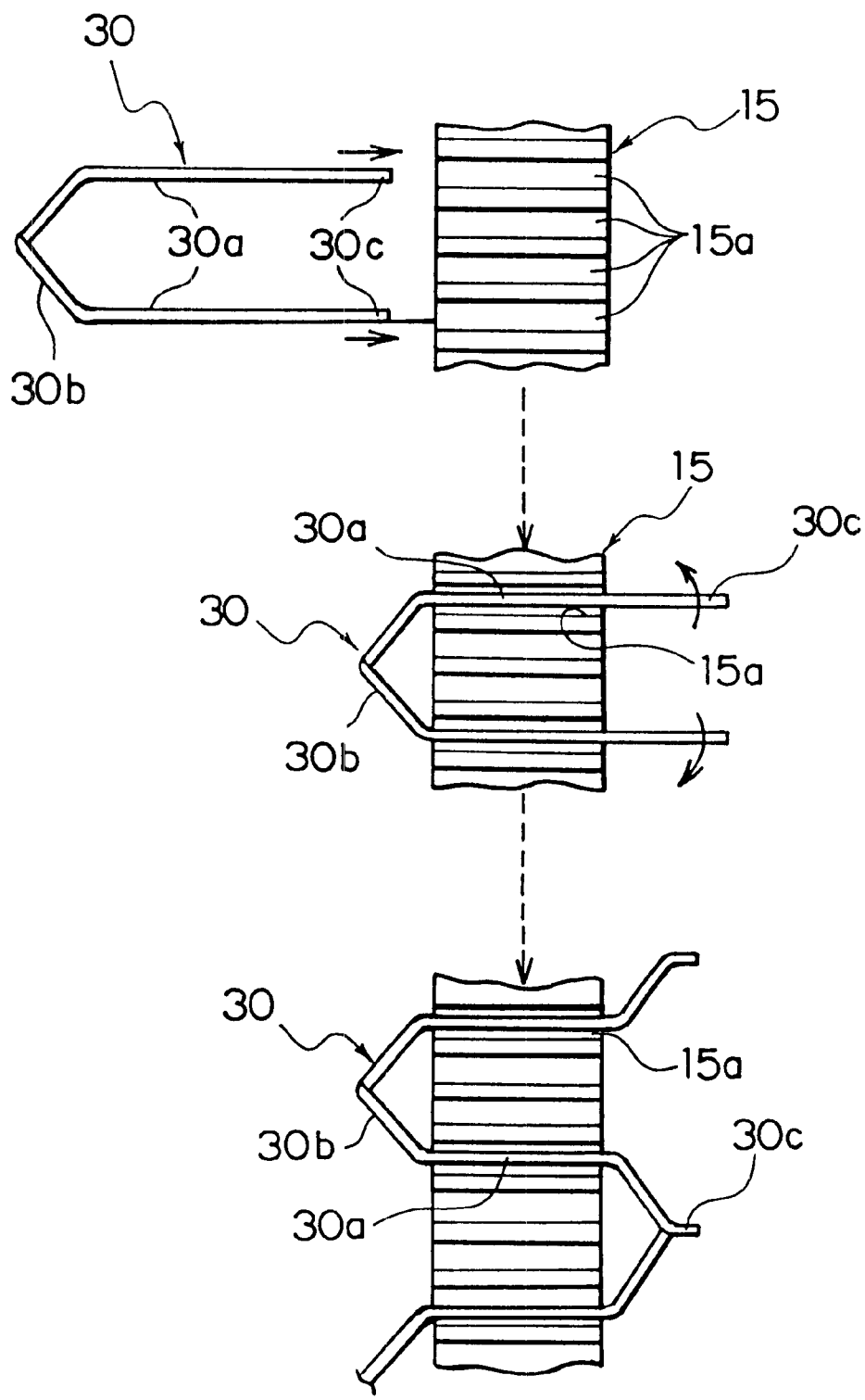
FIG. 22 is a series of cross sections explaining a manufacturing process for the conventional stator for an alternator.
Figure 23:
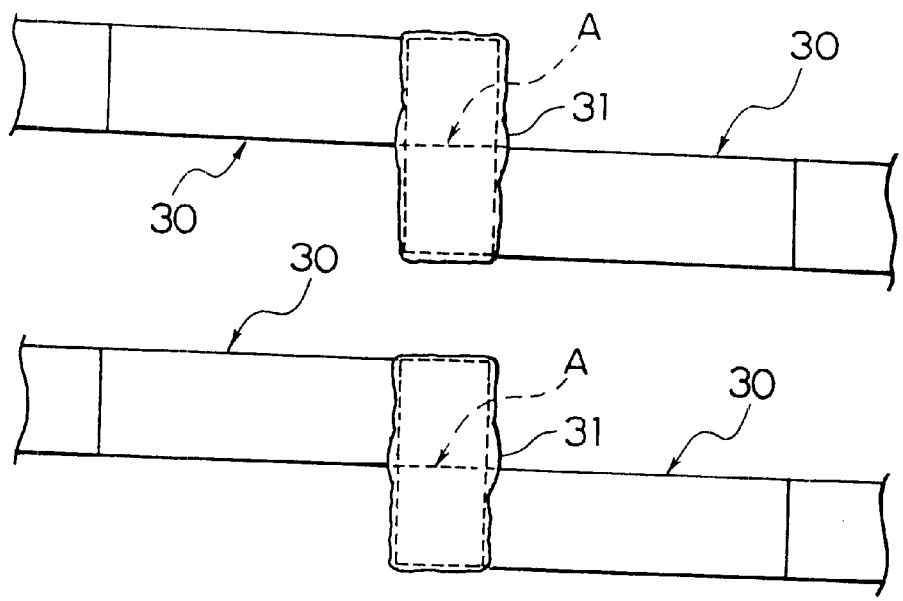
FIG. 23 is a partial enlargement of the conventional stator for an alternator shown in FIG. 22.
Figure 24:
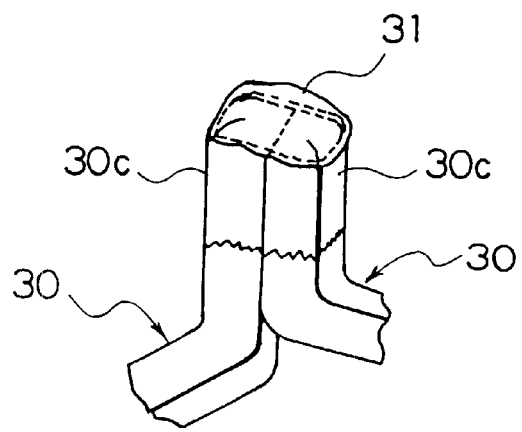
FIG. 24 is a partial perspective showing a joint portion of a stator coil in the conventional stator shown in FIG. 22.

Next, the parallelepiped laminated core 46 is rolled up and its ends abutted and welded to each other to obtain the cylindrical stator core 50, as shown in FIG. 19C. By rolling up the parallelepiped laminated core 46, the slots 46a (corresponding to the slots 50a in the stator core) take on a generally rectangular cross-sectional shape, and opening portions of the slots (corresponding to opening portions of the slots 50a) become smaller than the slot-width dimensions of the straight portions 40b. Then, the stator winding phase groups 54 are formed by connecting together the end portions of the strands of wire 40, based on the connection method shown in FIG. 10.

Thereafter, the electrically-insulating resin portions 35 are formed by immersing the front-end coil end group 51f of the stator prepared in this manner by a predetermined amount into a paint stored in liquid form in an immersion tank 36 and immersing the rear-end coil end group 51r by a predetermined amount into the paint stored in the immersion tank 36, then lifting the stator out and allowing the electrically-insulating resin portions 35 to dry and set, so as to cover the surfaces of the apex portions of the turn portions 40a and fill the spaces between the apex portions of the radially-adjacent turn portions 40a to obtain the stator 81 as shown in FIG. 9.

Thus, according to Embodiment 6, because the surfaces of the coil ends, in other words, the surfaces of the apex portions of the turn portions 40a, which constitute the coil end groups 51f and 51r, are covered by the electrically-insulating resin portions 35, exposure of the copper material, in other words, the electrical conductor, of the strands of wire 40 is prevented by the electrically-insulating resin portions 35, even if the insulation coating on the apex portions of the turn portions 40a is damaged when the strands of wire 40 are bent. Furthermore, the spaces between the radially-adjacent turn portions 40a are filled by the electrically-insulating resin portions 35, and the spaces between the circumferentially-adjacent turn portions 40a are ensured.

Consequently, the same effects as in Embodiment 1 above can also be obtained in Embodiment 6.

In Embodiment 6, the stator coil 51 is composed of first to fourth winding sub-portions 41 to 44 in each of which one strand of wire 40 is wound so as to alternately occupy an inner layer and an outer layer in a slot depth direction within every sixth slot 50a, the strand of wire folding back outside the slots 50a at axial end surfaces of the stator core 50. The two winding assemblies 60A and 60B used are constituted by a pair of first and second winding groups, the first winding group being constituted by six first winding sub-portions 41 (third winding sub-portions 43) being disposed at a pitch of one slot from each other, and a second winding group constituted by six second winding sub-portions 42 (fourth winding sub-portions 44) disposed at a pitch of one slot from each other, the second winding sub-portions 42 (fourth winding sub-portions 44) being inversely wound and offset by an electrical angle of 180° relative to the first winding sub-portions 41 (the third winding sub-portions 43). The two winding assemblies 60A and 60B are installed the stator core 50 in two rows in a radial direction.

Thus, because the winding having one turn is formed from one strand of wire 40, the number of joints is significantly reduced compared to Embodiment 1 in which the winding having one turn is formed from a large number of U-shaped coil segments 30, enabling the productivity of the stator to be improved, and softening of the electrical conductors due to welding is eliminated, improving the rigidity of the stator, thereby enabling reducing magnetic noise to be reduced.

Furthermore, because the front-end coil end group 51$f$ is constituted by the turn portions 40$a$, the height to which the front-end coil end group 51$f$ protrudes from the end surface of the stator core 50 can be reduced compared to Embodiment 1 in which the front-end coil end group 51$f$ is constructed by joining together the free ends 30$c$ of the coil segments 30. Thus, wind resistance in front-end coil end group 51$f$ is lessened, enabling wind noise resulting from the rotation of the rotor 7 to be lowered, and coil leakage reactance is reduced, improving output and efficiency.

Furthermore, by installing the winding assemblies 60A and 60B into the stator core 50 in two rows, six stator winding phase groups 54 are wound into the stator core 50 at once, enabling assembly to be significantly improved.

Because the turn portions 40$a$ are arranged circumferentially to line up in two rows radially, the turn portions 40$a$ constituting the coil end groups 51$f$ and 51$r$ are each distributed into two rows radially, reducing the heights to which the coil end groups 51$f$ and 51$r$ extend outwards from the end surfaces of the stator core 50. Thus, wind resistance in the coil end groups 51$f$ and 51$r$ is lessened, enabling wind noise resulting from the rotation of the rotor 7 to be lowered.

Because the turn portions 40$a$ can be easily formed into a generally identical shape, the coil end groups 51$f$ and 51$r$ which are both constituted by the turn portions 40$a$ can be formed into the generally identical shape. Thus, circumferential irregularities on inner radial surfaces of the coil end groups 51$f$ and 51$r$ are lessened, reducing wind noise generated between the rotor 7 and the coil end groups 51$f$ and 51$r$. Furthermore, leakage inductance becomes uniform at the front and rear ends, providing stable output. In addition, heat dissipation becomes uniform in each of the turn portions 40$a$, and thus heat dissipation becomes uniform in the coil end groups 51$f$ and 51$r$, improving the cooling of the stator coil 51.

Moreover, in each of the above Embodiments, each stator winding phase group has four turns, but the stator winding phase groups in the present invention are not limited to having four turns, and may have two turns or six turns, for example.

Furthermore, in the present invention, because the electrically-insulating resin portions 35 are applied and formed such that the electrically-insulating resin portions 35 cover the surfaces of the apex portions of the coil ends, the effect increases when the invention is applied to a stator core having a greater number of slots in which the separation between the coil ends becomes narrower.

The present invention is constructed in the above manner and exhibits the effects described below.

According to the present invention, there is provided a stator for an alternator, the stator including:

a cylindrical stator core formed with a number of slots extending axially at a predetermined pitch in a circumferential direction; and a stator coil installed in the stator core, the stator coil including a number of winding sub-portions, each of the winding sub-portions being installed in the stator core by housing electrically-insulated strands of wire in slots a predetermined number of slots apart so as to form different layers relative to a slot depth direction and connecting the different layers in the slots the predetermined number of slots apart to each other in series outside the slots in a predetermined connection pattern to form coil ends, the coil ends being aligned and mutually spaced circumferentially to constitute two coil end groups of the stator coil, an electrically-insulating resin portion being formed by applying a resin so as to cover surfaces of apex portions of the coil ends constituting at least one of the two coil end groups while ensuring air passage spaces between circumferentially-adjacent coil ends, providing a stator for an alternator enabling reliability and performance to be improved without decreasing the cooling of the coil end groups.

The coil ends in each of the two coil end groups may be arranged circumferentially around the stator core so as to line up in two rows radially, enabling axial length of the coil end groups to be kept short.

The apex portions of the coil ends may be arranged in a zigzag formation, enabling the electrically-insulating resin portion to be applied and formed so as to reliably cover the surfaces of the apex portions of the coil ends.

Spaces between the radially adjacent apex portions of the coil ends of the stator core may be filled by the electrically-insulating resin portion, increasing the rigidity of the coil end groups, thereby enabling magnetic noise to be reduced.

The strands of wire may be formed with a flat cross sectional shape, enabling the electrically-insulating resin portion to be formed to a uniform film thickness on the surfaces of the apex portions of the coil ends, and thereby increasing the insulation reliability.

The electrically-insulating resin portion may be formed on the apex portions of the coil ends by painting, enabling air passage spaces to be easily formed between circumferentially-adjacent coil ends.

The electrically-insulating resin portion may be formed on the apex portions of the coil ends by spray painting, simplifying the painting equipment, thereby enabling the electrically-insulating resin portion to be formed at low cost.

The electrically-insulating resin portion may be formed on the apex portions of the coil ends by a fluid bed coating immersion method, eliminating the need for masking, thereby improving the operation of applying the electrically-insulating resin.

The resin used in the electrically-insulating resin portion may have as its main component an epoxy resin having a predetermined viscosity such that the resin does not spread from the apex portions of the coil ends or adhere to portions of the strands of wire other than the apex portions while drying or setting, ensuring air passage spaces between circumferentially-adjacent coil ends, and enabling reductions in cooling to be suppressed.

A single-component resin setting at room temperature may be used for the electrically-insulating resin portion, eliminating the need for a drying furnace, thereby enabling the electrically-insulating resin portion to be formed at low cost.

A two-component resin setting at room temperature may be used for the electrically-insulating resin portion, improving the storage of the paint components, and enabling painting to be carried out easily.

A thermosetting epoxy resin powder paint may be used for the electrically-insulating resin portion, providing an electrically-insulating resin portion with superior strength and heat resistance.

The strands of wire may be composed of coil segments being electrically-insulated electrical conductors formed into a general U shape, and each of the winding sub-portions may be constructed by inserting the coil segments into slots a predetermined number of slots apart so as to form different layers relative to a slot depth direction and bending and joining free ends of the coil segments extending from the slots the predetermined number of slots apart requiring connection to each other, enabling the stator coil to be prepared by inserting the coil segments into the stator core after preparing the cylindrical stator core, thereby facilitating the manufacturing of the stator.

The U-shaped coil segments may be inserted into the slots from one axial end of the stator core, making the coil ends constituting each of the coil end groups into a generally identical shape, thereby increasing the arrangeability of the coil ends.

The strands of wire may be continuous wires composed of electrically-insulated electrical conductors, making the coil ends into continuous-wire turn portions, thereby reducing the axial height of the coil end groups.

The winding sub-portions may be constituted by at least one winding assembly composed of a pair of first and second winding groups, the first winding group including a number of first winding sub-portions each having one turn constructed by winding one of the electrically-insulated strands of wire so as to fold back outside the slots at axial end surfaces of the stator core and alternately occupy an inner layer and an outer layer in a slot depth direction within the slots at intervals of the predetermined number of slots, the first winding sub-portions being disposed at a pitch of one slot from each other and being equal in number to the predetermined number of slots, and the second winding group including a number of second sub-portions each having one turn constructed by winding one of the strands of wire so as to fold back outside the slots at axial end surfaces of the stator core and alternately occupy an inner layer and an outer layer in a slot depth direction within the slots at intervals of the predetermined number of slots and so as to be inversely wound and offset by an electrical angle of 180° relative to the first sub-portions, the second sub-portions being disposed at a pitch of one slot from each other and being equal in number to the predetermined number of slots, enabling the present invention to be adapted to a stator coil having a large number of turns in each stator winding phase group simply by increasing the number of winding assemblies.

What is claimed is:

1. A stator for an alternator, said stator comprising:
   a cylindrical stator core formed with a number of slots extending axially at a predetermined pitch in a circumferential direction; and
   a stator coil installed in said stator core,
   said stator coil comprising a number of winding sub-portions,
   each of said winding sub-portions being installed in said stator core by housing electrically-insulated strands of wire in slots a predetermined number of slots apart so as to form different layers relative to a slot depth direction and connecting said different layers in said slots said predetermined number of slots apart to each other in series outside said slots in a predetermined connection pattern to form coil ends,
   said coil ends being aligned and mutually spaced circumferentially to constitute two coil end groups of said stator coil,
   an electrically-insulating resin portion being formed by applying a resin so as to cover surfaces of apex portions of said coil ends constituting at least one of said two coil end groups while ensuring air passage spaces between circumferentially-adjacent coil ends and those between radially-adjacent coil ends below said apex portions thereof.

2. The stator for an alternator according to claim 1 wherein said coil ends in each of said two coil end groups are arranged circumferentially around said stator core so as to line up in two rows radially.

3. The stator for an alternator according to claim 2 wherein said apex portions of said coil ends are arranged in a zigzag formation.

4. The stator for an alternator according to claim 2 wherein spaces between radially-adjacent apex portions of said coil ends of said stator core are filled by said electrically-insulating resin portion.

5. The stator for an alternator according to claim 1 wherein said strands of wire are formed with a flat cross-sectional shape.

6. The stator for an alternator according to claim 1 wherein said electrically-insulating resin portion is formed on said apex portions of said coil ends by painting.

7. The stator for an alternator according to claim 6 wherein said electrically-insulating resin portion is formed on said apex portions of said coil ends by spray painting.

8. The stator for an alternator according to claim 6 said electrically-insulating resin portion is formed on said apex portions of said coil ends by a fluid bed coating method.

9. The stator for an alternator according to claim 6 wherein said resin used in said electrically-insulating resin portion has as its main component an epoxy resin having a predetermined viscosity such that said resin does not spread from said apex portions of said coil ends or adhere to portions of said strands of wire other than said apex portions while drying or setting.

10. The stator for an alternator according to claim 6 wherein a single-component resin setting at room temperature is used for said electrically-insulating resin portion.

11. The stator for an alternator according to claim 6 wherein a two-component resin setting at room temperature is used for said electrically-insulating resin portion.

12. The stator for an alternator according to claim 8 wherein a thermosetting epoxy resin powder paint is used for said electrically-insulating resin portion.

13. The stator for an alternator according to claim 1 wherein:
   said strands of wire are composed of coil segments being electrically-insulated electrical conductors formed into a general U shape; and
   each of said winding sub-portions is constructed by inserting said coil segments into slots a predetermined number of slots apart so as to form different layers relative to a slot depth direction and bending and joining free ends of said coil segments extending from said slots said predetermined number of slots apart requiring connection to each other.

14. The stator for an alternator according to claim 13 wherein said U-shaped coil segments are inserted into said slots from one axial end of said stator core.

15. The stator for an alternator according to claim 1 wherein said strands of wire are continuous wires composed of electrically-insulated electrical conductors.

16. A stator for an alternator, said stator comprising:

a cylindrical stator core formed with a number of slots extending axially at a predetermined pitch in a circumferential direction; and a stator coil installed in said stator core, said stator coil comprising a number of winding sub-portions, each of said winding sub-portions being installed in said stator core by housing electrically-insulated strands of wire in slots a predetermined number of slots apart so as to form different layers relative to a slot depth direction and connecting said different layers in said slots said predetermined number of slots apart to each other in series outside said slots in a predetermined connection pattern to form coil ends, said coil ends being aligned and mutually spaced circumferentially to constitute two coil end groups of said stator coil, an electrically-insulating resin portion being formed by applying a resin so as to cover surfaces of apex portions of said coil ends constituting at least one of said two coil end groups while ensuring air passage spaces between circumferentially-adjacent coil ends, wherein said strands of wire are continuous wires composed of electrically-insulated electrical conductors, and said winding sub-portions are constituted by at least one winding assembly composed of a pair of first and second winding groups, said first winding group comprising a number of first winding sub-portions each having one turn constructed by winding one of said electrically-insulated strands of wire so as to fold back outside said slots at axial end surfaces of said stator core and alternately occupy an inner layer and an outer layer in a slot depth direction within said slots at intervals of said predetermined number of slots, said first winding sub-portions being disposed at a pitch of one slot from each other and being equal in number to said predetermined number of slots, and said second winding group comprising a number of second sub-portions each having one turn constructed by winding one of said strands of wire so as to fold back outside said slots at axial end surfaces of said stator core and alternately occupy an inner layer and an outer layer in a slot depth direction within said slots at intervals of said predetermined number of slots and so as to be inversely wound and offset by an electrical angle of 180° relative to said first sub-portions, said second sub-portions being disposed at a pitch of one slot from each other and being equal in number to said predetermined number of slots.

* * * * *